(12) United States Patent
Von Stockhausen

(10) Patent No.: US 7,367,635 B2
(45) Date of Patent: May 6, 2008

(54) RAIL VEHICLE HAVING AN ELECTRICAL SIGNAL LINE LOOP

(75) Inventor: Ulrich Von Stockhausen, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/937,378

(22) Filed: Sep. 10, 2004

(65) Prior Publication Data

US 2005/0057352 A1   Mar. 17, 2005

(30) Foreign Application Priority Data

Sep. 11, 2003   (DE) ................................ 103 42 017

(51) Int. Cl.
*B60T 13/00* (2006.01)
(52) U.S. Cl. ........................ 303/20; 303/122.05; 303/3; 303/7
(58) Field of Classification Search .................... 303/3, 303/7, 20, 122, 122.04, 122.05, 122.08
See application file for complete search history.

(56) References Cited

U.S. PATENT DOCUMENTS

| | | | | |
|---|---|---|---|---|
| 5,590,042 A | * | 12/1996 | Allen et al. ................. | 701/70 |
| 6,250,723 B1 | * | 6/2001 | Barberis et al. .............. | 303/7 |
| 6,698,847 B2 | * | 3/2004 | Barberis et al. .............. | 303/3 |

FOREIGN PATENT DOCUMENTS

| | | |
|---|---|---|
| DE | 0 844 157 B1 | 1/2002 |
| DE | 10342017 B3 * | 9/2004 |
| EP | 0 958 980 A2 | 11/1999 |

* cited by examiner

*Primary Examiner*—Melanie Torres
(74) *Attorney, Agent, or Firm*—Harness, Dickey & Pierce, P.L.C.

(57) ABSTRACT

A rail vehicle includes an electrical signal line loop for activating the brakes. There is provision for a safety loop, which is redundant with respect to the signal line loop and is electrically independent of the rest of the vehicle control system, to be present.

21 Claims, 3 Drawing Sheets

RAIL VEHICLE HAVING AN ELECTRICAL SIGNAL LINE LOOP

The present application hereby claims priority under 35 U.S.C. §119 on German patent application number DE 103 42 017.7 filed Sep. 11, 2003, the entire contents of which are hereby incorporated herein by reference.

FIELD OF THE INVENTION

The invention generally relates to a rail vehicle having an electrical signal line loop for activating the brakes.

BACKGROUND OF THE INVENTION

A rail vehicle is known from EP 0 844 157 B1. The signal line loop is necessary here in order to enable a rail vehicle, which is not equipped with a compressed air brake system and is designed, in terms of its origin, as a tram, to operate on long distance rail routes according to the rules of EBO and UIC.

A compressed air brake system is defined by the fact that braking is triggered by a drop in pressure in an air line which leads through a train. This ensures that braking is always carried out when a defect occurs.

So that a corresponding principle which fulfills the requirements of EBO/UIC can also be implemented, for example, in tram trains, the signal line loop is provided in the trains. The signal line loop is a double line from the end of the train to the start of the train and back again and is therefore composed of a signal generating section and a signal distributing section. Control contacts are connected in series in the signal generating section.

The brakes and the electrical actuation devices, which may be, for example, brake control devices or emergency brake valves, are connected to the signal distributing section. The signal line loop operates according to the quiescent current principle, the brakes being activated if the flow of current in the signal line loop is interrupted. For example, a brake release key is additionally used to short circuit the signal distributing section to the reference potential of the supply voltage of the signal line loop.

Current is usually fed in at the end of the train and signal generating and signal distributing sections are usually connected at the front end of the train where the occupied driver's cab is located.

In contrast, the compressed air brake system does not have the usual dependencies. The feeding point (compressed air supply), control (generation of the drop in pressure) and triggering (for example brake valves) can be connected to the air line in any desired sequence and independently of the start of the train and the end of the train.

When a breakdown occurs, the defective rail vehicle has to be towed away. When there is a compressed air brake system, which is customary in longer-distance rail trains, all that is necessary is to connect the air lines of the defective rail vehicle (broken down vehicle) and the towing rail vehicle (recovery vehicle) to one another in order to ensure that the brakes function throughout. However, if a signal line loop is present, problems occur with the braking.

Specifically, as a result of damage to the electrical circuit which has not yet been detected, the braking capability during the towing operation could be disrupted or even prevented. For example, a connection of the signal line loop to the supply potential, which is caused by a defect, could cause the quiescent current principle to be disabled. For this reason, in the past the signal line loops of the towing rail vehicle and of the towed, defective rail vehicle have generally not been connected to one another. Since it was not possible to brake the towed vehicle, the towing operation was possible only if the operational environment and the applicable regulations permit an exception so that rapid clearing of a section of line which is necessary for operational reasons was possible.

Even if the signal line loop is operationally capable in the broken down vehicle, the continuous signal line loop cannot be formed and the brakes in the broken down vehicle cannot be activated if the recovery vehicle is to push the broken down vehicle. This is due to the customary circuit topology in which the signal line loop in the driver's cab of the broken down vehicle has a connection between the signal generating section and the signal distributing section and as a result the signal line loop cannot be extended forwards without additional switching devices, and thus not without special modes of operation.

SUMMARY OF THE INVENTION

An embodiment of the invention may include an object of specifying a rail vehicle with an electrical signal line loop which is used to activate the brakes, in which rail vehicle the principle of the signal line loop can be extended beyond the entire vehicle grouping formed from the broken down vehicle and the recovery vehicle. This is to be possible even if the recovery vehicle pushes the broken down vehicle.

An object may be achieved according to an embodiment of the invention in that a signal line loop which is redundant with respect to the signal line loop and is electrically independent of the rest of the vehicle control system is present.

The signal line loop is referred to below as "redundant safety loop". It is of precisely the same design as the signal line loop and obeys its functional principles.

The vehicle which is to be towed is firstly only mechanically coupled to the recovery vehicle. The electrical lines which are usually present are not connected to one another. Only the signal line loop of the recovery vehicle and the redundant safety loop of the broken down vehicle are connected, thus ensuring the function of an intact signal line loop which runs through the entire vehicle grouping formed from the broken down vehicle and the recovery vehicle.

This provides the advantage that both vehicles which are connected to one another can always be braked together. Specifically, it is possible to assume that in a defective vehicle the electrical signal line loop is also affected.

With the redundant safety loop, a redundant system is advantageously present, and the system can also be extended to the front and to the rear even beyond the ends of the vehicle where the driver's cab is located so that one or more broken down vehicles can either be towed or pushed.

For example, the redundant safety loop at each end of the vehicle is closed off by a dummy plug which connects the signal generating section of the safety loop to its signal distributing section, or the safety loop is connected via a mobile connecting cable to the redundant safety loop or to the signal line loop of a vehicle which is coupled to the rail vehicle.

Corresponding arrangements are also possible at the other end of the rail vehicle.

Using dummy connecting links and mobile connecting cables provides the advantage that the redundant safety loops of individual vehicles which are coupled do not have to be continuously connected to one another, which, during normal operation, would make additional operating processes necessary when coupling the vehicles to one another. Instead, the redundant safety loops are closed off with, for example, captive dummy plugs and which are not removed until a broken down vehicle is to be towed so that the safety loops of the broken down vehicle and those of the towing recovery vehicle can be connected via a mobile connecting cable.

The redundant safety loop is connected, for example, to electrical venting valves of the brakes. This ensures that the two rail vehicles which are coupled to one another can always be braked simultaneously with both brakes.

For example, the brake release keys of all the coupled vehicles are connected into the redundant safety loop.

For example, the brake release keys are connected both to the signal line loop and to the redundant safety loop.

The brake release keys act with different contact faces both on the signal line loop and on the redundant safety loop so that the driver is always provided with the same operator control, irrespective of whether he is in a recovery vehicle or a broken down vehicle.

This provides the advantage that braking can be initiated from any of the driver's cabs. Even if the defective rail vehicle is pushed, the brakes of the broken down vehicle and of the recovery vehicle can be activated from the driver's cab of the pushing rail vehicle. This also applies to a plurality of broken down vehicles or recovery vehicles.

Before the brakes can be activated in the broken down vehicle, they must be released. If the brakes are compressed air brakes, an excess pressure in the compressed air line must firstly be built up for this purpose.

For example, in order to release the brakes of a defective vehicle, an emergency release pump is connected to the brakes. This emergency release pump is permanently installed and generates the pressure which is necessary to release the brakes. This provides the advantage that releasing the brakes and braking again are respectively reversible processes. Renewed braking is brought about in such a way that the redundant safety loop causes the emergency release circuit in which the switched-off emergency release pump is located to be vented via a solenoid valve in accordance with the quiescent current principle. The defective rail vehicle can therefore be towed away safely.

For example, in order to release the brakes of a defective vehicle, an emergency release valve, is connected to the brakes and is arranged in a line which proceeds from an air tank or oil reservoir. Air or oil is available in said air tank or oil reservoir under sufficient pressure to release the brakes.

The emergency release pump can also be a hand pump or a portable air tank (compressed air bottle) which can be stowed in the vehicle at any desired location during normal operation and be set up in the driver's cab and connected only in order to tow the defective vehicle.

The emergency release pump may, for example, also be used in conjunction with a hydraulic brake system, according to the same principle. The hand pump is then connected to an oil reservoir.

Emergency release and renewed braking may be a reversible process.

For example, a vehicle can have two emergency release circuits. This increases the safety. For example, only one emergency release pump for an emergency release circuit is carried along in the vehicle and another emergency release pump for the other emergency release circuit, which is necessary for complete emergency release, is provided by the recovery vehicle.

Such a solution has the advantage of requiring little space for storage. Owing to the fact that only one emergency release pump is onboard, complete emergency release, and thus the risk of unintentional rolling away of an individual vehicle, is impossible.

In order to apply the brakes quickly, the signal line loop can, for example, be connected to the redundant safety loop in the same vehicle via the mobile connecting cable.

For example, the redundant safety loop is connected via an electro-pneumatic adapter to a pneumatic brake line of a vehicle which is coupled to the rail vehicle. It may specifically be the case that a rail vehicle with a signal line loop is to be towed away by a vehicle with a compressed air brake system, for example by a locomotive. The adapter converts changes in pressure in lines of the compressed air brake system into electrical signals and can also convert the electrical signals back into changes in pressure. The adapter therefore acts in both directions. The redundant safety loop is also supplied generally by the recovery vehicle in this case.

The rail vehicle according to an embodiment of the invention provides, in particular, the advantage that the rail vehicle itself can be towed away quickly and safely since it is always capable of braking in the customary way. Furthermore, the rail vehicle can, however, also be used to tow away another defective vehicle, the towing rail vehicle permitting reliable braking of the defective vehicle, and vice versa. Unintentional separation of trains also causes all the parts of the train to brake thanks to the quiescent current principle of the signal line loop and of the redundant safety loop.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention.

The rail vehicle having an electrical signal line loop is explained in more detail with reference to the drawings, wherein.

DETAILED DESCRIPTION OF THE
EXEMPLARY EMBODIMENTS OF THE
INVENTION

Figure 1:
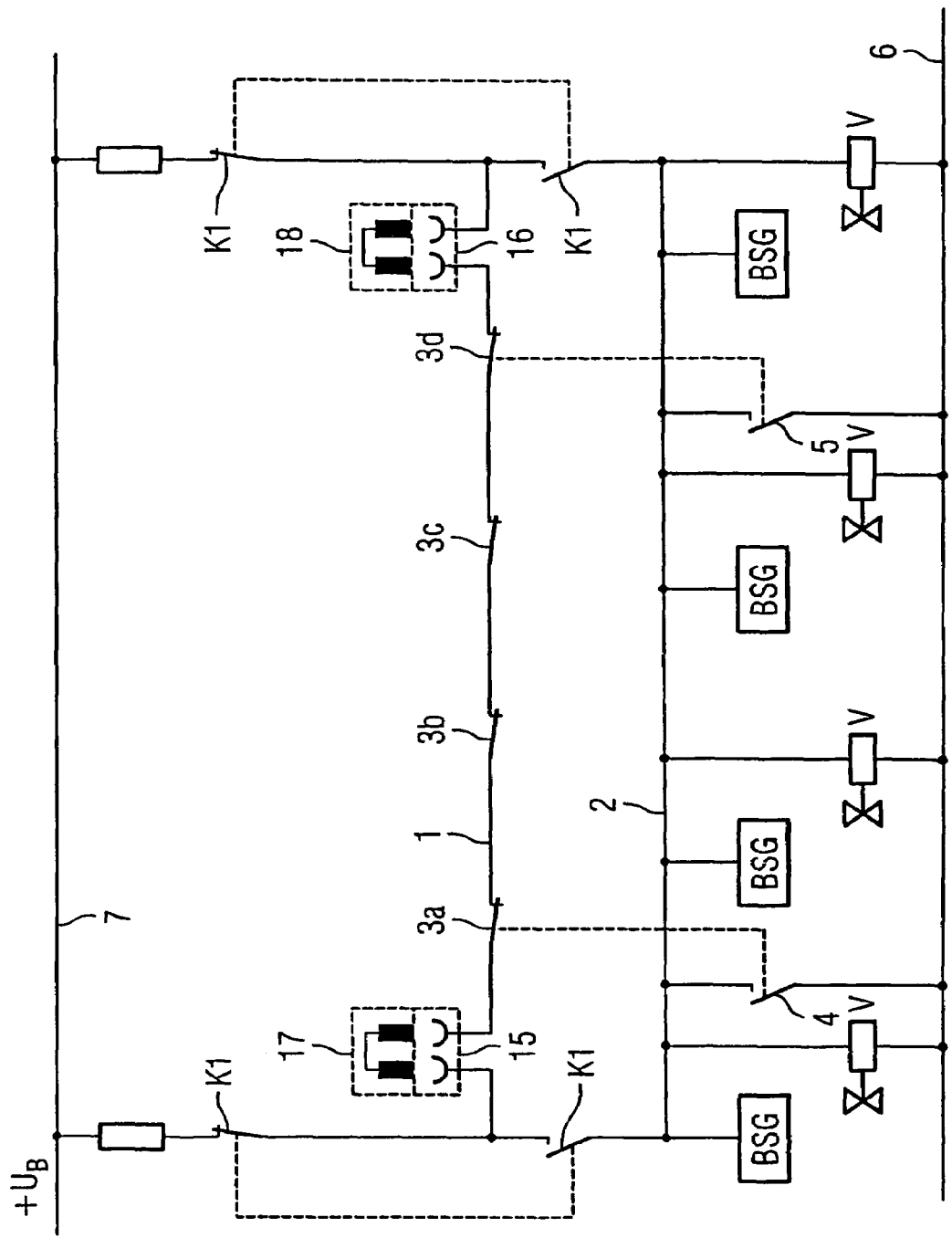
FIG. 1 shows an individual vehicle with a signal line loop.
Figure 2:
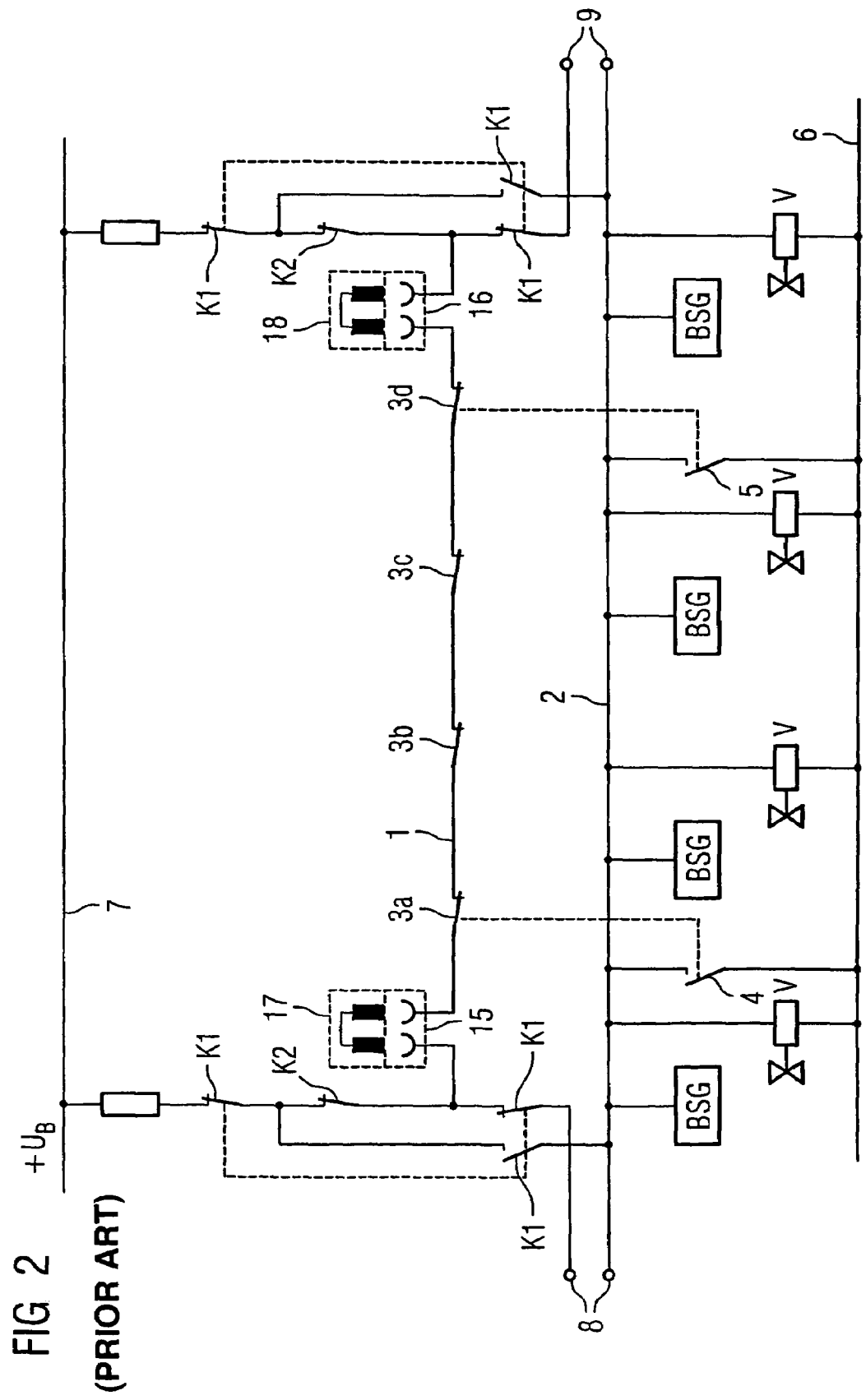
FIG. 2 shows a train grouping with a signal line loop.
Figure 3:
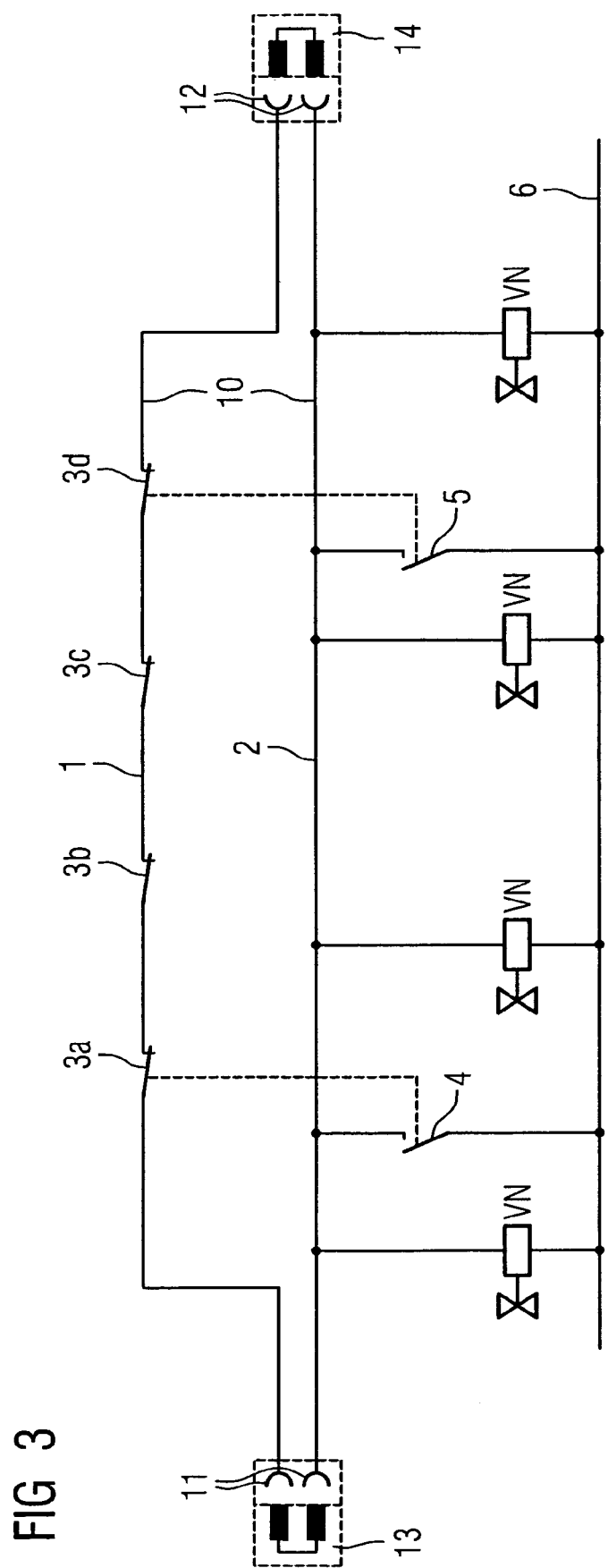
FIG. 3 shows a rail vehicle with a redundant safety loop according to an embodiment of the invention.

So that the requirements of the EBO/UIC are also fulfilled in a tram train, a signal line loop, composed of a signal generating section 1 and a signal distributing section 2 are present in said train (FIGS. 1 to 3). Both sections run as a double line from the end of the train to the start of the train and back. Control contacts 3a to 3d are arranged in series in the signal generating section 1.

Electrical actuation devices for the brakes are arranged at the signal distributing section 2. These actuation devices are the brake control devices BSG and the emergency brake valves V which trigger a compressed air brake.

The signal line loop operates according to the quiescent current principle, which means that the brake systems are activated if the flow of current in the signal line loop is interrupted. Control contacts 4 or 5 are used for braking and they can be connected to brake release keys and connect the signal distributing section 2 to a zero potential 6. In addition, the signal distributing section 2 can be short circuited to the reference potential of the supply voltage 7 of the signal line loop by closing the control contacts 3a to 3d.

The feeding in location in the signal line loop and also the connection of the signal generating section 1 and signal distributing section 2 depend on the design of the train grouping and on the assignment of the driver's cabs. In an individual vehicle according to FIG. 1, the feeding in is usually carried out at the train end and the connection of the signal generating section 1 and signal distributing section 2 is carried out at the front tip of the train where the occupied driver's cab is also located. Contacts K1, which are composed of two coupled switching elements, the first of which is located in the connection from the voltage supply 7 to the signal generating section 1 and the second of which is located in the connection from the signal generating section 1 to the signal distributing section 2, serve to permit signals to be fed in at the respective train end and for the signals to be interrupted where the train end is not located. For this purpose, of the two coupled switching elements one is always open and one closed. The contacts K1 form the connection between the signal generating section 1 and the signal distributing section 2, at the front tip of the train where the occupied driver's cab is located.

FIG. 2 shows, in addition to what is illustrated in FIG. 1, that electrical couplings 8, 9 for a train grouping are arranged at both ends of a vehicle in order to be able to couple to another vehicle. Furthermore, additional contacts K2 are arranged in FIG. 2, said contacts K2 serving only to prevent feeding in from the voltage supply 7 within the train grouping.

If the signal line loop is connected to the voltage supply 7 owing to a defect, the quiescent current principle is disabled. In this case, towing away can be carried out only if the towed broken down vehicle cannot be braked.

Even when there is a functionally capable signal line loop in the broken down vehicle, the brakes there cannot be activated if the broken down vehicle is to be pushed. This is due to the fact that the signal line loop cannot be extended forwards beyond the occupied driver's cab.

In order to solve the problems, in the rail vehicle according to an embodiment of the invention a safety loop 10 which is redundant with respect to the signal line loop and is electrically independent of the rest of the vehicle control system is present, said safety loop 10 being illustrated in FIG. 3. It is of precisely the same design as the signal line loop and obeys its functional principles.

When the vehicle to be towed is coupled to the recovery vehicle, the electrical lines which are usually present are not connected to one another. Only the signal line loop of the recovery vehicle is connected to the redundant safety loop 10 of the broken down vehicle. This provides the advantage that, on the one hand, if the signal line loop in the defective vehicle should also be defective the operationally capable redundant safety loop 10 is always available and that, on the other hand, said safety loop 10 is equipped in such a way that it can be connected to coupled vehicles both at the front and at the rear. As a result, broken down vehicles can advantageously both be towed and pushed. It is even possible to tow or push a plurality of defective broken down vehicles simultaneously without the function of the brakes having to be adversely affected.

The redundant safety loop 10 which is shown in FIG. 3 has, at each end of the vehicle, a plug-type connection 11, 12 which is closed off by means of dummy plugs 13, 14 if a vehicle is not coupled to the rail vehicle. As a result, in this case the signal generating section 1 and the signal distributing section 2 are connected to one another. In order to couple the signal line loop of a recovery vehicle to a plug-type connection 11, 12, the corresponding dummy plug 13, 14 is removed. The dummy plugs 13 and 14 are also used to define the location at which the energy is to be fed into the redundant safety loop 10, and the location at which the signal generating section 1 and the signal distributing section 2 are to be connected to one another. This is easily carried out by virtue of the fact that the dummy plug 13, 14 is plugged on to the connecting location and the connection to the signal line loop of a recovery vehicle is made at the feeding in location.

During normal operation, the redundant safety loops 10 are closed off in each vehicle by dummy plugs 13, 14. Only for the recovery mode is the dummy plug 13, 14 removed at the location where coupling is to take place, ensuring a connection between the plug-type connection 11, 12 and a plug-type connection of the other vehicle by way of mobile connecting cables (not shown). For this reason, during normal operation the redundant safety loops 10 of individual vehicles advantageously do not need to be connected to one another, which would entail additional effort when coupling vehicles to one another. The mobile connecting cables are stored in the vehicle at a suitable location.

The control contacts 4, 5 shown in FIGS. 1 and 2 can also be connected into the redundant safety loop 10 according to FIG. 3 so that brake release keys can always act on the redundant safety loop 10. The train driver therefore always has the same operator control available irrespective of whether he is located in a recovery vehicle or in a broken down vehicle. Venting valves VN, which are connected to the redundant safety loop 10, are solenoid valves which support the braking process by venting a compressed air brake line when the redundant safety loop 10, which operates according to the quiescent current principle, responds. An emergency release pump can be carried along in order to release the compressed air brake.

In order to couple the redundancy loop 10 according to FIG. 3 to a signal line loop according to FIGS. 1 or 2, a plug-type connection 15, 16 is present there, said connection normally being closed off by way of a dummy plug 17, 18.

The rail vehicle according to the invention provides the advantage that reliable braking is always ensured even when a defective vehicle is towed.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A rail vehicle, comprising:
   an electrical signal line loop for activating brakes of the rail vehicle; and
   a safety loop, redundant with respect to the signal line loop and electrically independent of a remainder of a control system of the rail vehicle, wherein the safety loop is only used to establish signal connection with another vehicle for towing the rail vehicle, upon the electrical signal line loop being non-functional for establishing such a signal connection, and wherein the safety loop is connected to a signal line loop of another vehicle coupled to the rail vehicle.

2. The rail vehicle as claimed in claim 1, wherein the redundant safety loop is closed off at each end of the vehicle by a dummy plug which connects a signal generating section of the safety loop to a signal distributing section of the safety loop.

3. The rail vehicle as claimed in claim 1, wherein the redundant safety loop is connected to electrical venting valves of the brakes.

4. The rail vehicle as claimed in claim 1, wherein brake release keys of all the coupled vehicles are connected into the redundant safety loop.

5. The rail vehicle as claimed in claim 4, wherein the brake release keys are connected both to the signal line loop and to the redundant safety loop.

6. The rail vehicle as claimed in claim 1, wherein, in order to release the brakes of a defective vehicle, an emergency release pump is connected to the brakes.

7. The rail vehicle as claimed in claim 1, wherein, in order to release the brakes of a defective vehicle, an emergency release valve is connected to the brakes and is arranged in a line which proceeds from at least one of an air tank and an oil reservoir.

8. The rail vehicle as claimed in claim 6, wherein a vehicle has two emergency release circuits.

9. The rail vehicle as claimed in claim 8, wherein only one emergency release pump for the one emergency release circuit is carried along in the vehicle and another emergency release pump is made available for the other emergency release circuit by the recovery vehicle.

10. The rail vehicle as claimed in claim 1, wherein, in order to apply the brakes, the signal line loop and the redundant safety loop in the same vehicle are connectable via a mobile connecting cable.

11. The rail vehicle as claimed in claim 1, wherein the redundant safety loop is connected via an electro-pneumatic adapter to a pneumatic brake line of a vehicle which is coupled to the rail vehicle.

12. The rail vehicle as claimed in claim 1, wherein a mobile connecting cable is used to connect the safety loop to at least one of the redundant safety loop and the signal line loop of a vehicle coupled to said rail vehicle.

13. The rail vehicle as claimed in claim 2, wherein the redundant safety loop is connected to electrical venting valves of the brakes.

14. The rail vehicle as claimed in claim 12, wherein the redundant safety loop is connected to electrical venting valves of the brakes.

15. The rail vehicle as claimed in claim 2, wherein brake release keys of all the coupled vehicles are connected into the redundant safety loop.

16. The rail vehicle as claimed in claim 3, wherein brake release keys of all the coupled vehicles are connected into the redundant safety loop.

17. The rail vehicle as claimed in claim 12, wherein brake release keys of all the coupled vehicles are connected into the redundant safety loop.

18. The rail vehicle as claimed in claim 15, wherein the brake release keys are connected both to the signal line loop and to the redundant safety loop.

19. The rail vehicle as claimed in claim 7, wherein a vehicle has two emergency release circuits.

20. The rail vehicle as claimed in claim 1, wherein the established signal connection permits reliable braking of both the rail vehicle and the another vehicle.

21. The rail vehicle as claimed in claim 1, wherein the safety loop is connected to a safety loop of another vehicle coupled to the rail vehicle.

* * * * *